United States Patent
Ivanovic et al.

(10) Patent No.: US 11,102,488 B2
(45) Date of Patent: Aug. 24, 2021

(54) MULTI-SCALE METRIC-BASED ENCODING

(71) Applicant: ATI TECHNOLOGIES ULC, Markham (CA)

(72) Inventors: Boris Ivanovic, Markham (CA); Mehdi Saeedi, Markham (CA); Edward G. Callway, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/427,482

(22) Filed: May 31, 2019

(65) Prior Publication Data

US 2020/0382791 A1 Dec. 3, 2020

(51) Int. Cl.
| H04N 11/02 | (2006.01) |
| H04N 19/14 | (2014.01) |
| H04N 19/176 | (2014.01) |
| H04N 19/196 | (2014.01) |
| H04N 19/33 | (2014.01) |

(52) U.S. Cl.
CPC ........... *H04N 19/14* (2014.11); *H04N 19/176* (2014.11); *H04N 19/197* (2014.11); *H04N 19/33* (2014.11)

(58) Field of Classification Search
CPC ..................................................... H04N 19/14
USPC ................................................. 375/240.01–29
See application file for complete search history.

(56) References Cited

U.S. PATENT DOCUMENTS

| 5,051,840 A * | 9/1991 | Watanabe | ............ | H04N 19/176 |
| | | | | 375/E7.14 |
| 5,309,232 A * | 5/1994 | Hartung | ............... | H04N 19/507 |
| | | | | 348/384.1 |
| 6,393,159 B1* | 5/2002 | Prasad | ..................... | G06K 9/44 |
| | | | | 345/420 |
| 6,636,646 B1* | 10/2003 | Gindele | .................... | G06T 5/20 |
| | | | | 358/515 |
| 8,001,062 B1* | 8/2011 | Gargi | ................. | G06K 9/00536 |
| | | | | 706/12 |
| 9,418,408 B1* | 8/2016 | Thompson | .............. | G06T 5/009 |
| 2001/0016008 A1* | 8/2001 | Bahl | ................ | H04N 21/23655 |
| | | | | 375/240.18 |
| 2002/0181739 A1* | 12/2002 | Hallowell | ............... | G01W 1/02 |
| | | | | 382/100 |
| 2005/0100236 A1* | 5/2005 | Kong | ................... | H04N 19/176 |
| | | | | 382/261 |
| 2006/0002608 A1* | 1/2006 | Haddon | ................ | G06T 7/0012 |
| | | | | 382/173 |
| 2006/0045354 A1* | 3/2006 | Hanna | ................ | G06K 9/00771 |
| | | | | 382/224 |

(Continued)

OTHER PUBLICATIONS

Kim, Wook J. et al.,"A Bit Allocation Method Based on Picture Activity for Still Image Coding", IEEE Transactions on Image Processing, vol. 8, No. 7, Jul. 1999, 4 pages.

(Continued)

*Primary Examiner* — Leron Beck

(57) ABSTRACT

A processing system analyzes pixel activity levels of blocks of a picture at a plurality of spatial scales and/or dynamic ranges to generate a multi-scale metric that indicates how bit allocation or assignment of a given quantization parameter (QP) will affect the perceptual quality of the block. Blocks that have similar multi-scale metrics are likely to be visually similar and to benefit from similar bit allocations or QPs. Based on the multi-scale metric, an encoder encodes each block of the picture with a QP and/or a number of bits.

20 Claims, 7 Drawing Sheets

(56) References Cited

U.S. PATENT DOCUMENTS

| | | | | |
|---|---|---|---|---|
| 2007/0172120 A1* | 7/2007 | Roimela | ............. | G06T 9/00 |
| | | | | 382/166 |
| 2009/0324092 A1* | 12/2009 | Aoyama | ............. | G06T 5/002 |
| | | | | 382/199 |
| 2010/0002953 A1* | 1/2010 | Kirenko | ............. | H04N 5/142 |
| | | | | 382/268 |
| 2010/0305755 A1* | 12/2010 | Heracles | ............. | G06K 9/4671 |
| | | | | 700/253 |
| 2012/0062747 A1* | 3/2012 | Zeng | ............. | G06K 9/00798 |
| | | | | 348/149 |
| 2013/0089136 A1* | 4/2013 | Srinivasan | ............. | H04N 19/159 |
| | | | | 375/240.03 |
| 2013/0107956 A1* | 5/2013 | Muijs | ............. | G06T 9/004 |
| | | | | 375/240.12 |
| 2014/0079120 A1* | 3/2014 | Hiraoka | ............. | H04N 19/176 |
| | | | | 375/240.12 |
| 2016/0088316 A1* | 3/2016 | Novotny | ............. | H04N 19/80 |
| | | | | 375/240.29 |
| 2018/0352264 A1* | 12/2018 | Guo | ............. | H04N 19/86 |

OTHER PUBLICATIONS

Hosking, Brett. et al., "An Adaptive Resolution Rate Control Method for Intra Coding in HEVC", 2016 IEEE International Conference on Acoustics, Speech and Signal Processing (ICASSP), Mar. 2016, 5 pages.

Li, Ye. et al., "A Convolutional Neural Network-Based Approach to Rate Control in HEVC intra coding" 2017 IEEE Visual Communications and Image Processing (VCIP), Dec. 2017, 4 pages.

* cited by examiner

MULTI-SCALE METRIC-BASED ENCODING

BACKGROUND

A multimedia server generates data representative of pictures in a multimedia stream, e.g., a multimedia stream that has been requested by a user. An encoder of the multimedia server encodes the data for each picture to form a bitstream that is transmitted over a network to a decoder that decodes the bitstream and provides the decoded video information to a multimedia application or any other application for display to the user. Such multimedia encoders and decoders are used in a wide variety of applications to facilitate the storage and transfer of multimedia streams in a compressed fashion.

To compress multimedia streams, conventional encoders implement video compression algorithms in which the degree of compression depends in part on a quality parameter such as a quantization parameter. A quantization parameter is a number that can be used to derive a standard matrix for implementing a codec. A higher quantization parameter often results in lower bit usage for a picture, whereas a lower quantization parameter often results in higher bit usage for the picture. Compression algorithms use different quantization parameters that affect the allocation of bits to titles, frames, slices, and blocks of pictures. However, bits are frequently allocated inefficiently within pictures by the compression algorithms due to applying a quantization parameter that is either too low or too high. If too low, the quantization parameter results in the unnecessary consumption of computing resources and bandwidth in encoding, transmitting, and decoding of pictures, without any commensurate benefit. If the quantization parameter is too high, the result is unnecessarily (or unacceptably) reduced quality of encoded pictures. For a given block of a picture, the effect of adjusting the quantization parameter and the number of bits that are allocated to encode the block on perceptible quality is not readily apparent.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
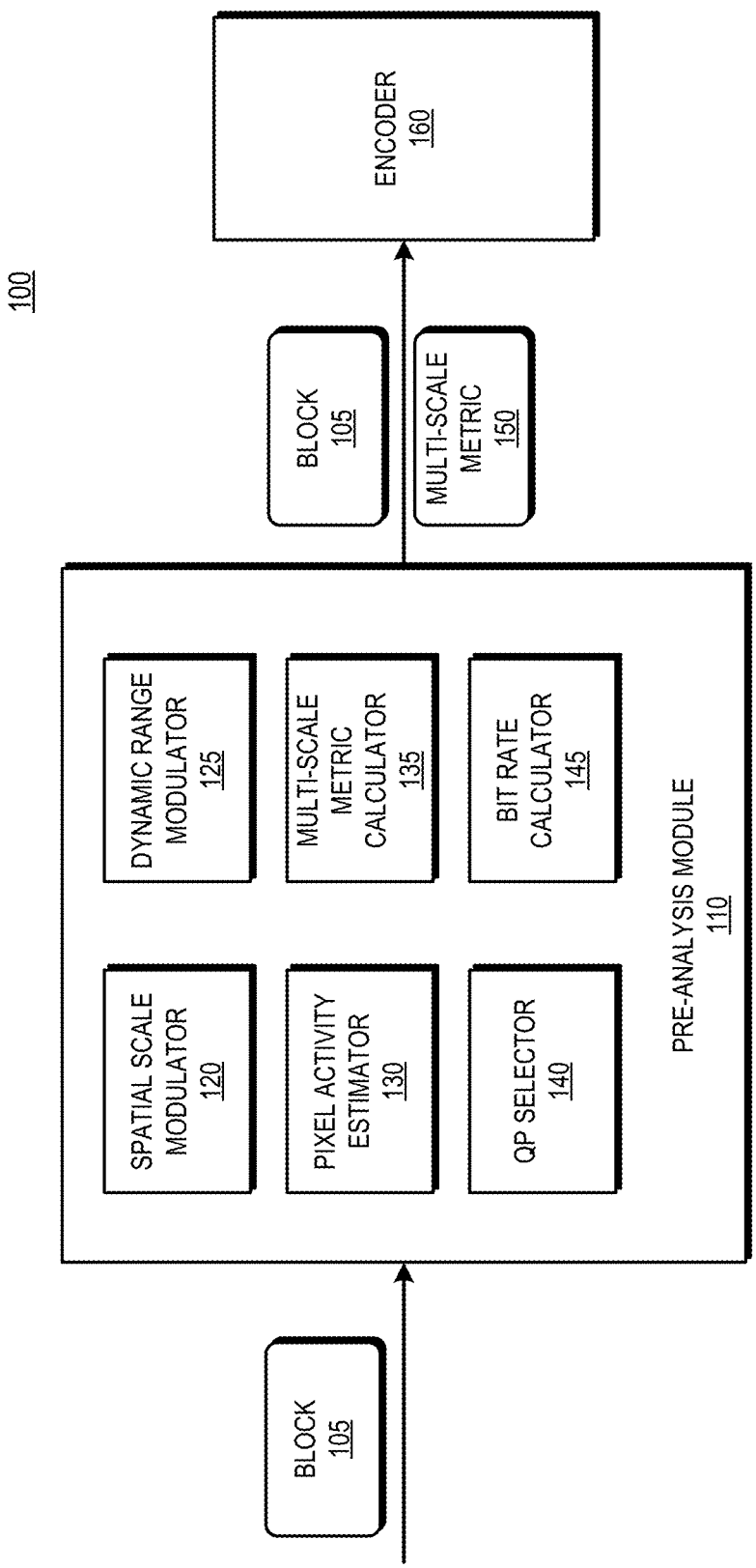
FIG. 1 is a block diagram of a processing system that includes a pre-analysis module to measure pixel activity for each block of a picture at a plurality of spatial scales and dynamic ranges to generate a multi-scale metric in accordance with some embodiments.

FIGS. 1-7 illustrate processing systems and techniques for generating a multi-scale metric to characterize a portion, or block, of a picture for predicting a number of bits to be allocated to the portion during encoding of a multimedia stream. A pre-analysis module of the processing system assesses pixel activities of a block at a plurality of spatial compression scales and/or dynamic range scales. The pre-analysis module calculates a gradient of the block at each spatial scale and/or dynamic range to generate a multi-scale metric of the block. Based on the multi-scale metric, the pre-analysis module selects a quantization parameter (QP) or allocates bits to the block. In some embodiments, the multi-scale metric is used by the pre-analysis module to select a specific mode or partitioning scheme, or to narrow a selection of modes of evaluating blocks for intra-prediction or partitioning schemes that an encoder will evaluate. In some embodiments, the pre-analysis module selects a motion estimation search range based on the multi-scale metric. An encoder of the processing system encodes the block at a QP based on the multi-scale metric or using a predicted number of bits based on the multi-scale metric. In some embodiments, the pre-analysis module is incorporated into the encoder.

Each block of a picture includes a degree of fine or coarse detail, contrast, structures, color, brightness. Pixel activity such as variations of pixel intensities within a portion may be used to detect edges, repeating patterns, and other structures or objects in an image. Pixel activity can be measured using various metrics such as, for example, using a gray-level co-occurrence matrix, a two-dimensional spatial mean gradient, wavelet or other transforms, discrete cosine function, or average value within a portion. A single measurement of pixel activity such as 2D spatial gradient or wavelet transform can result in similar measurements for blocks that are actually dissimilar, such as block including a carpet versus a block including a plain sheet of white paper. Thus, characterizing blocks based on a single measurement of pixel activity results in insufficient information to determine how best to allocate bits or assign a QP to the block.

By analyzing the pixel activity level of each block at a plurality of spatial scales and/or dynamic ranges, the pre-analysis module generates a multi-scale metric (also referred to as an "N-tuple" characterization, with N representing the number of different spatial scales and dynamic ranges for which measurements are taken of the blocks) that characterizes the block and indirectly indicates how bit allocation or assignment of a given QP will affect the perceptual quality of the block. In some embodiments, the multi-scale metric includes an indication of the presence or distribution of flesh tone and/or other "memory colors" (i.e., the canonical hues of objects such as grass and sky that human observers acquire through experiences with the objects and that have special significance to the human visual system) within a block. In addition, blocks that have similar multi-scale metrics, or N-tuples, as measured by, e.g., Cartesian difference between multi-scale metrics, are likely to be visually similar and to benefit from similar bit allocations or QPs. Based on the multi-scale metric, the encoder encodes each block of the frame with a QP and/or a number of bits. The encoder transmits the encoded frame over a network to a decoder that decodes the bitstream and provides the decoded video information to a multimedia application for display to the user.

FIG. 1 illustrates a processing system 100 that includes a pre-analysis module 110 to measure pixel activity for a block of a picture at a plurality of spatial scales and dynamic ranges to generate a multi-scale metric for encoding the picture at an encoder 160 in accordance with some embodiments. The pre-analysis module 110 may be implemented as hard-coded logic, programmable logic, software executed by a processor, or a combination thereof. In some embodiments, the processing system 100 is distributed across a variety of electronic devices, such as a server, personal computer, tablet, set top box, gaming system, mobile phone, and the like.

The pre-analysis module 110 includes a spatial scale modulator 120, a dynamic range modulator 125, a pixel activity estimator 130, a multi-scale metric calculator 135, a quantization parameter (QP) selector 140, and a bit rate calculator 145, each of which may be implemented as hard-coded logic, programmable logic, software executed by a processor, or a combination thereof. The processing system 100 receives digital information that represents a stream or sequence of pictures in a multimedia stream. The term "multimedia" refers to a stream of data including video data, audio data, and the like, or a combination thereof, and in some embodiments also include control data, metadata, and the like, or any combination thereof. The processing system 100 divides each picture into coding units such as macroblocks, coding tree blocks (CTBs), titles, and slices, referred to herein as "blocks", which are provided to the pre-analysis module 110.

The spatial scale modulator 120 is a video/image scaler that adjusts the spatial scale of each block while the pixel activity estimator 130 calculates pixel activity for each block at each spatial scale setting. "Spatial scale" refers to the number of pixels represented by the block, and a pixel is the smallest addressable element in a display device. For example, in some embodiments, the spatial scale modulator 120 rescales each block to a plurality of spatial scale settings, such as 1:1, 2:1, 4:1, and 8:1, such that for a block of 16×16 pixels (i.e., a macroblock), at a 1:1 spatial scale, the block is unaltered (16×16 pixels), at a 2:1 spatial scale, the original 16×16 block is compressed to 8×8 pixels, at a 4:1 spatial scale, the block is compressed to 4×4 pixels, and at an 8:1 spatial scale, the block is compressed to 2×2 pixels. In some embodiments, the spatial scale modulator 120 low pass filters the signal for each block before or during the scaling process to prevent aliasing. For example, in some embodiments, the spatial scale modulator 120 employs a 4-tap or 8-tap finite impulse response (FIR) filter which effectively performs low-pass filtering using a corresponding number of appropriate coefficients prior to decimation. The filtering causes blurring, which may or may not cause information to be lost, depending on the amount of detail in the block. In some embodiments, the spatial scale modulator 120 uses a recursive method in which the imagery within each block is scaled for each successive spatial scale setting as it was in the previous spatial scale setting.

At each spatial scale setting, the pixel activity estimator 130 calculates the pixel activity level for the block using a pixel activity metric. In some embodiments, the pixel activity estimator 130 calculates pixel activity for each block using a 2D spatial mean gradient. A 2D spatial mean gradient captures vertical and horizontal edges. In some embodiments, the pixel activity estimator 130 calculates pixel activity of each block using a wavelet transform or other transform to measure an activity parameter for a given block. Thus, the pixel activity estimator 130 measures the amount of information (if any) that is lost at each progressive level of spatial scaling by the spatial scale modulator 120.

The dynamic range modulator 125 adjusts the dynamic range of each block while the pixel activity estimator 130 calculates pixel activity for each block at each dynamic range setting. "Dynamic range" refers to the number of tonal values of a pixel. For example, in some embodiments, the dynamic range modulator 125 applies a plurality of dynamic range settings, such as 1:1, 2:1, 4:1, and 8:1, such that for a block having an original dynamic range of 0→255 grayscale values, at a 1:1 dynamic range, the block has 0→255 grayscale values, at a 2:1 dynamic range, the block has 0→127 grayscale values, at a 4:1 dynamic range, the block has 0→63 grayscale values, and at an 8:1 dynamic range, the block has 0→31 grayscale values. At each dynamic range setting, the pixel activity estimator 130 calculates pixel activity for the block using a pixel activity metric.

The multi-scale metric calculator 135 generates a multi-scale metric 150 for each block based on the N pixel activity levels calculated by the pixel activity estimator 130 at each setting of the spatial scale modulator 120 and/or the dynamic range modulator 125. In some embodiments, the multi-scale metric calculator 135 uses normalized pixel activity level values (e.g., values that are normalized with respect to the maximum pixel activity value), which can be represented by a floating-point number or a fixed-point number. In some embodiments, the multi-scale metric calculator 135 generates a multi-scale metric 150 based on the difference in values at different spatial scales and/or dynamic ranges. The multi-scale metric 150 is an N-tuple number such as a matrix representing the N pixel activity measurements calculated by the pixel activity estimator 130 at each of the N settings of the spatial scale modulator 120 and/or the dynamic range modulator 125.

In some embodiments, the pre-analysis module 110 includes only one or the other of the spatial scale modulator 120 and the dynamic range modulator 125. In other embodiments, the pre-analysis module 110 includes both the spatial scale modulator 120 and the dynamic range modulator 125, and the pixel activity estimator 130 calculates pixel activities for the block at combined settings of the spatial scale modulator 120 and the dynamic range modulator 125. For a 16-tuple multi-scale metric representing pixel activity levels measured for a block at four spatial scale settings and four dynamic range settings, the multi-scale metric in some embodiments represents the information described below in Table 1.

TABLE 1

| 1:1 spatial scale | 2:1 spatial scale | 4:1 spatial scale | 8:1 spatial scale |
|---|---|---|---|
| 1:1 dynamic scale | 1:1 dynamic scale | 1:1 dynamic scale | 1:1 dynamic scale |
| Pixels under study: 16 × 16 | Pixels under study: 8 × 8 | Pixels under study: 4 × 4 | Pixels under study: 2 × 2 |
| 1:1 spatial scale | 2:1 spatial scale | 4:1 spatial scale | 8:1 spatial scale |
| 2:1 dynamic scale | 2:1 dynamic scale | 2:1 dynamic scale | 2:1 dynamic scale |
| Pixels under study: 16 × 16 | Pixels under study: 8 × 8 | Pixels under study: 4 × 4 | Pixels under study: 2 × 2 |
| 1:1 spatial scale | 2:1 spatial scale | 4:1 spatial scale | 8:1 spatial scale |
| 4:1 dynamic scale | 4:1 dynamic scale | 4:1 dynamic scale | 4:1 dynamic scale |

TABLE 1-continued

| Pixels under study: 16 × 16 1:1 spatial scale 8:1 dynamic scale | Pixels under study: 8 × 8 2:1 spatial scale 8:1 dynamic scale | Pixels under study: 4 × 4 4:1 spatial scale 8:1 dynamic scale | Pixels under study: 2 × 2 8:1 spatial scale 8:1 dynamic scale |
|---|---|---|---|
| Pixels under study: 16 × 16 | Pixels under study: 8 × 8 | Pixels under study: 4 × 4 | Pixels under study: 2 × 2 |

Thus, from left to right, the components of the multi-scale metric as depicted in Table 1 reflect the contribution of details from fine to coarse. From top to bottom, the components of the multi-scale metric as depicted in Table 1 reflect the contribution of details from all contrast levels to high contrast only. The contributions of details from fine to coarse and from all contrast levels to high contrast only relate directly to the discrete cosine transform (DCT) and direct sine transform (DST) or wavelet transforms that underlie many video and image compression algorithms. Pre-analysis module 110 uses the multi-scale metric to train a regressive model or machine learning model to allocate bits for encoding each macroblock based on budgetary or perceptual targets.

Using a regressive model or machine learning methods, in some embodiments, the bit rate calculator 145 models relationships between the number of bits that are to be used to compress a block for a given quantization parameter (QP), based on the multi-scale metric 150. In some embodiments, the QP selector 140 uses the multi-scale metric 150, among other factors such as historical data, pre-analysis of the picture, or a combination thereof, to determine the QP that is required to fit the block into a specific number of bits, within a margin of error. In some embodiments the pre-analysis module 110 generates multi-scale metrics for a plurality of blocks and compares the multi-scale metrics of the blocks to determine similarities and differences between them, such as by determining a Cartesian difference between multi-scale metrics. Once the QP has been determined for a first block, the QP selector 140 applies a similar QP to other blocks having multi-scale metrics that are similar to the multi-scale metric of the first block, within a threshold. In some embodiments, the QP and/or number of bits are determined directly by the encoder 160, based on the multi-scale metric 105.

Figure 2:
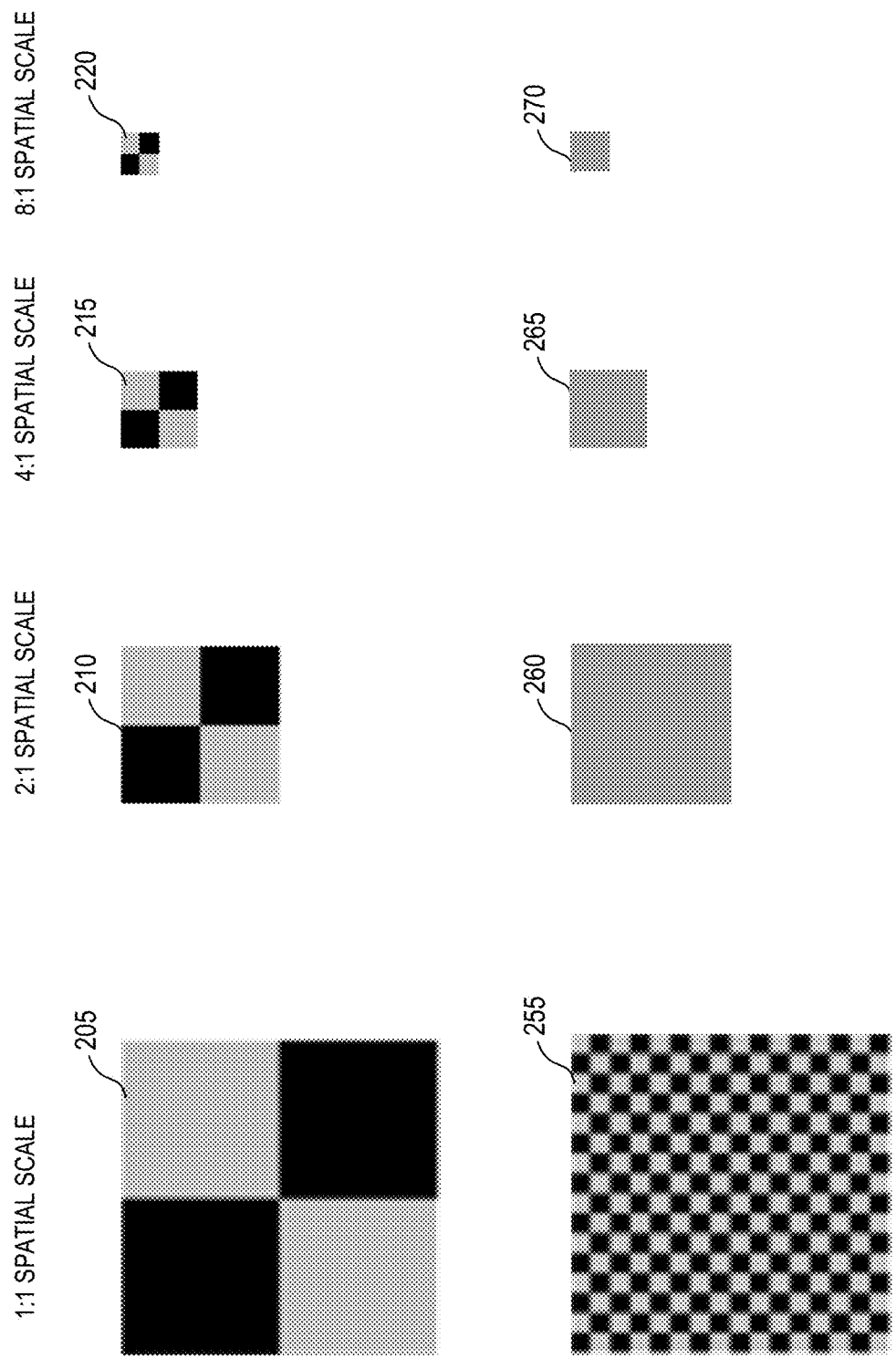
FIG. 2 is an illustration of the effects of varying the spatial scales of two sample blocks in accordance with some embodiments.

FIG. 2 illustrates the effects of varying the spatial scales of two sample blocks 205 and 255 in accordance with some embodiments. Blocks 205 and 255 are illustrated at a 1:1 spatial scale. Block 205 is a checkerboard pattern of four squares, with black squares at the upper left and lower right quadrants and light gray squares at the upper right and lower left quadrants. Block 255 is a checkerboard pattern of 256 squares, with 16 columns and 16 rows of alternating black and light gray squares.

When the spatial scale for blocks 205 and 255 is adjusted to a 2:1 spatial scale, resulting in blocks 210 and 260, respectively, block 210 retains the perceptual characteristics of block 205, in that block 210 also appears as a checkerboard pattern of four squares, with black squares at the upper left and lower right quadrants and light gray squares at the upper right and lower left quadrants. By contrast, at a 2:1 reduction in spatial scale, the checker pattern of block 260 is no longer apparent in block 255.

When the spatial scale for blocks 205 and 255 is further adjusted to a 4:1 spatial scale, resulting in blocks 215 and 265, respectively, block 215 still retains the perceptual characteristics of block 205, whereas block 265 appears to be a flat gray square. Similarly, when the spatial scale for blocks 205 and 255 is adjusted to an 8:1 spatial scale, resulting in blocks 220 and 270, the checkerboard pattern can still be seen in block 220, whereas block 270 appears to be a flat gray square, retaining none of the fine detail of block 255.

A multi-scale metric for reflecting the four spatial scale settings (1:1, 2:1, 4:1, and 8:1) shown in FIG. 2 at a single dynamic range setting is a 4-tuple. Assuming that the pixel activity is a 2D spatial gradient having a value between 0 and 1, with 0 indicating no vertical or horizontal edges and 1 indicating a maximum amount of vertical and horizontal edges, the pixel activity value for block 205, which is an 8×8 pixel checkerboard pattern, is 0.125, because the pattern has ⅛ of the maximum number of transitions for its size. The pixel activity value for block 210, which is the 8×8 checkerboard pattern of block 205 scaled 2:1, is 0.25, because the pattern has ¼ of the maximum number of transitions for its size. The pixel activity value for block 215, which is the 8×8 checkerboard pattern of block 205 scaled 4:1, is 0.5, because the pattern has half of the maximum number of transitions for its size. The pixel activity value for block 220, which is the 8×8 checkerboard pattern of block 205 scaled 8:1, is 1.0, because the pattern has a maximum number of transitions for its size. Thus, the multi-scale metric for block 205, at the spatial scales illustrated as blocks 205, 210, 215, and 220, is represented as [0.125, 0.25, 0.5, 1].

Block 255, by contrast, is a 1×1 pixel checkerboard pattern which has a pixel activity value of 1.0, because the pattern has a maximum number of transitions for its size. Block 260, which has the 1×1 checkerboard pattern of block 255 scaled 2:1, has a pixel activity value of 0, because the low pass filtering of the scaling affects the pattern of the block 260 to the point that there is no activity in the signal. Blocks 265 and 270, which have the 1×1 checkerboard pattern of block 255 scaled 4:1 and 8:1, respectively, also have pixel activity values of 0, because there is no activity in the signals. Thus, the multiscale metric for block 255, at the spatial scales illustrated as blocks 255, 260, 265, and 270, is represented as [1, 0, 0, 0]. The multi-scale metric of [0.125, 0.25, 0.5, 1] indicates that the spatial gradient of block 205 doubles at each spatial scale and is therefore dominated by coarse detail that is not diminished by a reduction in spatial scale. By contrast, the multi-scale metric of [1, 0, 0, 0] indicates that the gradient of block 255 is affected by a change in spatial scale, and therefore includes a significant amount of fine detail. Thus, by incorporating measures of 2D spatial gradients or other metrics of pixel activity at a plurality of spatial scales, the multi-scale metric provides an indication of the contribution of fine and coarse details to a block.

Figure 3:
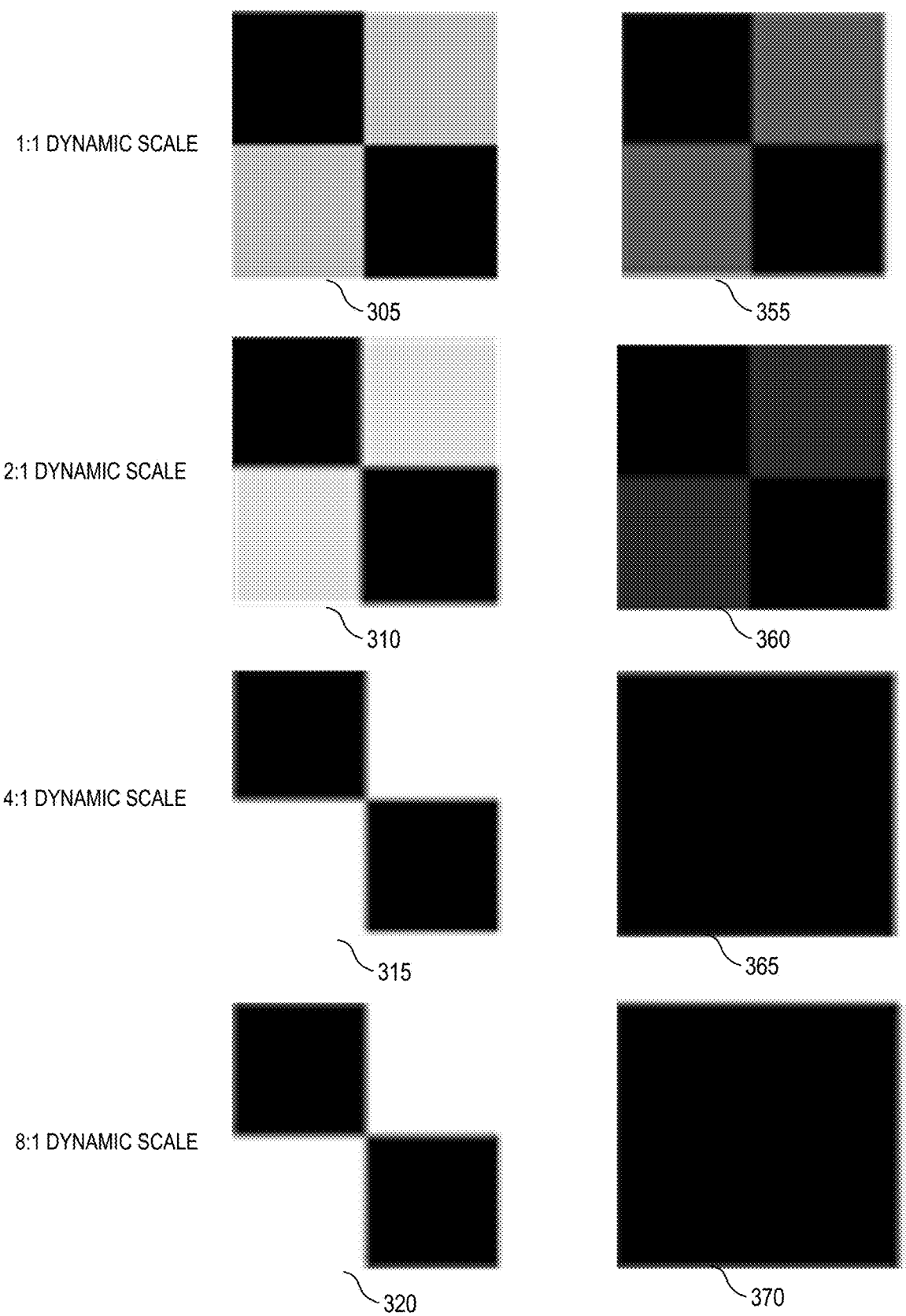
FIG. 3 is an illustration of the effects of varying the dynamic ranges of two sample blocks in accordance with some embodiments.

FIG. 3 illustrates the effects of varying the dynamic ranges of two sample blocks 305 and 355 in accordance with some embodiments. Blocks 305 and 355 are illustrated at a 1:1 dynamic range having 256 grayscale values of 0→255. Block 305 is a checkerboard pattern of four squares, with black squares at the upper left and lower right quadrants and light gray squares at the upper right and lower left quadrants. Block 355 is a checkerboard pattern of four squares, with black squares at the upper left and lower right quadrants and dark gray squares at the upper right and lower left quadrants.

When the dynamic range for blocks 305 and 355 is adjusted to a 2:1 dynamic range scale having 128 grayscale values of 0→127, resulting in blocks 310 and 360, respectively, the light gray squares of block 310 become relatively lighter, while the black square remain black. Thus, with a 2:1 reduction in dynamic range, the gradient of block 310 is higher than the gradient of block 305. By contrast, at a 2:1 reduction in dynamic range, the gradient of block 360 is lower than the gradient of block 355, although it is still possible to discern a checkerboard pattern of block 360.

When the dynamic range for blocks 305 and 355 is further adjusted to a 4:1 dynamic range scale having 64 grayscale values of 0→63, resulting in blocks 315 and 365, respectively, the gray squares of block 305 have become nearly white as shown in block 315, while the block squares have remained black. At a 4:1 reduction in dynamic range, the gray squares of block 355 have become essentially black in block 365, such that the gradient of block 365 approaches zero. Similarly, when the dynamic range for blocks 305 and 355 is adjusted to an 8:1 spatial scale having 32 grayscale values of 0→31, resulting in blocks 320 and 370, the gradient of block 320 increases to a maximum value, whereas block 370 appears to be a flat black square of zero gradient.

A multi-scale metric for reflecting the four dynamic range settings (1:1, 2:1, 4:1, and 8:1) shown in FIG. 3 at a single spatial scale setting is a 4-tuple. Assuming that the pixel activity is a 2D spatial gradient having a value between 0 and 1, with 0 indicating no vertical or horizontal edges and 1 indicating a maximum amount of vertical and horizontal edges, the multi-scale metric for block 305 (at the spatial scales illustrated as blocks 305, 310, 315, and 320) is represented as [0.8, 0.9, 1.0, 1.0], and the multiscale metric for block 355 (at the spatial scales illustrated as blocks 355, 360, 365, and 370) is represented as [0.2, 0.1, 0, 0]. The multi-scale metric of [0.8, 0.9, 1.0, 1.0] indicates that the attenuation of high frequencies is more likely to be noticed for block 305, whereas the multi-scale metric of [0.2, 0.1, 0, 0] indicates that the attenuation of high frequencies is less likely to be noticed for block 355. Thus, by incorporating measures of 2D spatial gradients or other metrics of pixel activity at a plurality of dynamic ranges, the multi-scale metric provides an indication of the contribution of details from all contrast levels versus from only high contrast levels.

Figure 4:
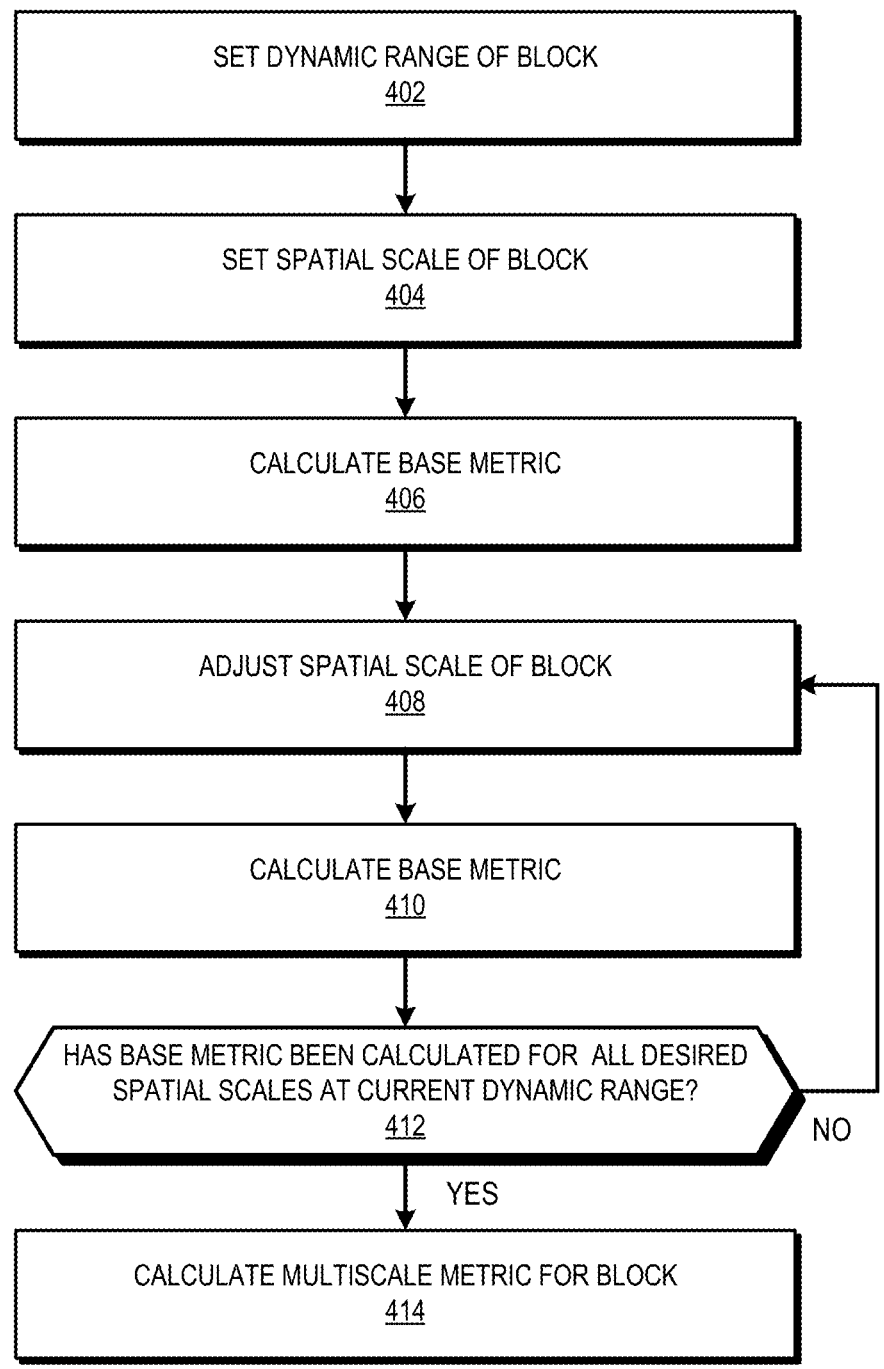
FIG. 4 is a flow diagram illustrating a method for calculating a multi-scale metric for a block based on a plurality of spatial scales in accordance with some embodiments.

FIG. 4 is a flow diagram illustrating a method 400 for calculating a multi-scale metric for a block based on a plurality of spatial scales in accordance with some embodiments. The method 400 is implemented in some embodiments of the processing system 100 shown in FIG. 1. At block 402, the dynamic range modulator 125 sets the dynamic range for the block 105. At block 404, the spatial scale modulator 120 sets the spatial scale for the block 105. At block 406, the pixel activity estimator 130 determines complexities or pixel activities within the block 105 using a selected "base metric" such as a 2D spatial gradient, wavelet transform, or another transform. At block 408, the spatial scale modulator 120 adjusts the spatial scale of the block 105 while the dynamic range remains unchanged. At block 410, the pixel activity estimator 130 determines complexities or pixel activities within the block 105 at the adjusted spatial scale using the selected base metric. At block 412, the pre-analysis module 110 determines whether the base metric has been calculated for the block 105 for all desired spatial scales at the current dynamic range. If, at block 412, the pre-analysis module 110 determines that the base metric for the block 105 has not yet been calculated for all desired spatial scales at the current dynamic range, the method flow continues back to block 408.

Conversely, if the pre-analysis module 110 determines at block 412 that the base metric for the block 105 has been calculated for all desired spatial scales at the current dynamic range, the method flow continues to block 414. At block 414, the multi-scale metric calculator 135 generates a multi-scale metric 150 for the block 105. In some embodiments, the multi-scale metric 150 includes normalized values of the base metrics measured at each spatial scale setting. In some embodiments, the normalized values of the multi-scale metric 150 are represented by a floating-point number or a fixed-point number.

Figure 5:
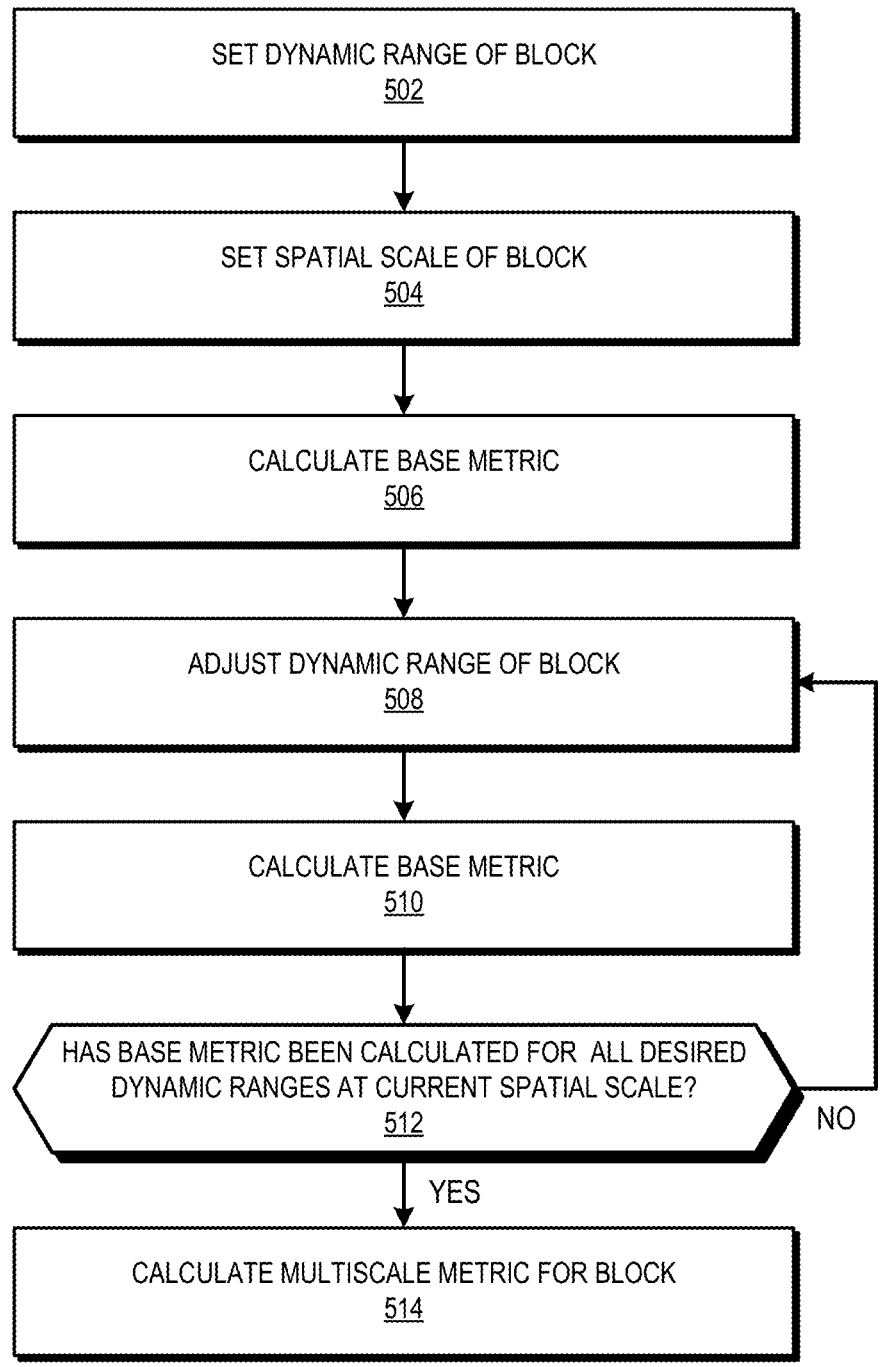
FIG. 5 is a flow diagram illustrating a method for calculating a multi-scale metric for a block based on a plurality of dynamic ranges in accordance with some embodiments.

FIG. 5 is a flow diagram illustrating a method 500 for calculating a multi-scale metric for a block based on a plurality of dynamic ranges in accordance with some embodiments. The method 500 is implemented in some embodiments of the processing system 100 shown in FIG. 1. At block 502, the dynamic range modulator 125 sets the dynamic range for the block 105. At block 504, the spatial scale modulator 120 sets the spatial scale for the block 105. At block 506, the pixel activity estimator 130 determines complexities or pixel activities within the block 105 using a selected "base metric" such as a 2D spatial gradient, wavelet transform, or another transform. At block 508, the dynamic range modulator 125 adjusts the dynamic range of the block 105 while the spatial scale remains unchanged. At block 510, the pixel activity estimator 130 determines complexities or pixel activities within the block 105 with the adjusted dynamic range using the selected base metric. At block 512, the pre-analysis module 110 determines whether the base metric has been calculated for the block 105 for all desired dynamic ranges at the current spatial scale. If, at block 512, the pre-analysis module 110 determines that the base metric for the block 105 has not yet been calculated for all desired dynamic ranges at the current spatial scale, the method flow continues back to block 508.

If, at block 512, the pre-analysis module 110 determines that the base metric for the block 105 has been calculated for all desired dynamic ranges at the current spatial scale, the method flow continues to block 514. At block 514, the multi-scale metric calculator 135 generates a multi-scale metric 150 for the block 105. In some embodiments, the multi-scale metric 150 includes normalized values of the base metrics measured at each dynamic range setting. In some embodiments, the normalized values of the multi-scale metric 150 are represented by a floating-point number or a fixed-point number.

Figure 6:
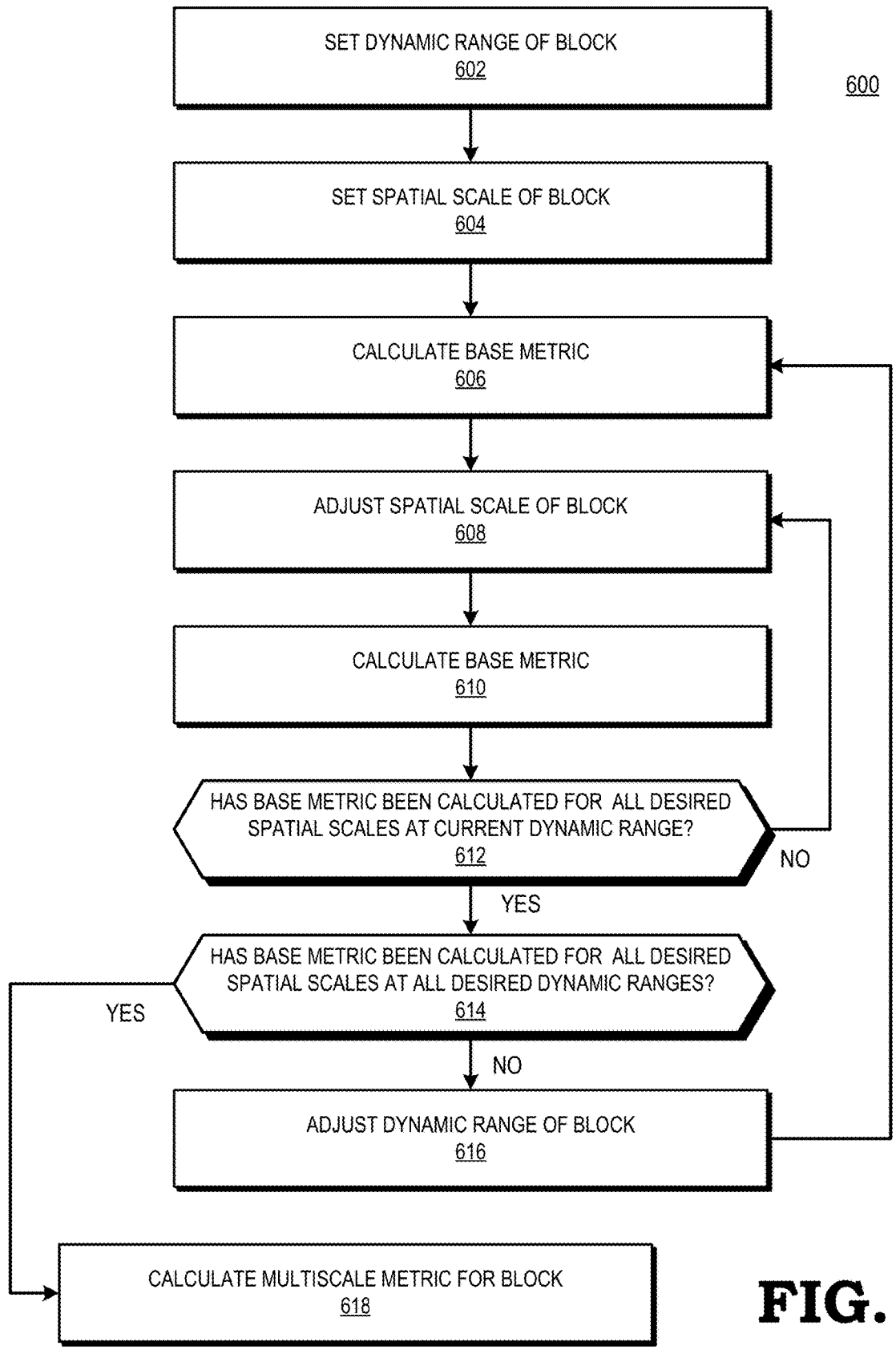
FIG. 6 is a flow diagram illustrating a method for calculating a multi-scale metric for a block based on a plurality of spatial scales and a plurality of dynamic ranges in accordance with some embodiments.

FIG. 6 is a flow diagram illustrating a method 600 for calculating a multi-scale metric for a block based on a plurality of spatial scales and a plurality of dynamic ranges in accordance with some embodiments. The method 600 is implemented in some embodiments of the processing system 100 shown in FIG. 1. At block 602, the dynamic range modulator 125 sets the dynamic range for the block 105. At block 604, the spatial scale modulator 120 sets the spatial scale for the block 105. At block 606, the pixel activity estimator 130 determines complexities or pixel activities within the block 105 using a selected "base metric" such as a 2D spatial gradient, wavelet transform, or other transform. At block 608, the spatial scale modulator 120 adjusts the spatial scale of the block 105 while the dynamic range remains unchanged. At block 610, the pixel activity estimator 130 determines complexities or pixel activities within the block 105 with the adjusted spatial scale using the selected base metric. At block 612, the pre-analysis module 110 determines whether the base metric has been calculated for the block 105 for all desired spatial scales at the current dynamic range. If, at block 612, the pre-analysis module 110 determines that the base metric for the block 105 has not yet been calculated for all desired spatial scales at the current dynamic range, the method flow continues back to block 608.

If, at block 612, the pre-analysis module 110 determines that the base metric for the block 105 has been calculated for all desired spatial scales at the current dynamic range, the method flow continues to block 614. At block 614, the pre-analysis module 110 determines whether the base metric has been calculated for the block 105 for all desired dynamic ranges at all desired spatial scales. If, at block 614, the pre-analysis module 110 determines that the base metric for the block 105 has not yet been calculated for all desired dynamic ranges at all desired spatial scales, the method flow continues to block 616. At block 616, the dynamic range modulator 125 adjusts the dynamic range of the block 105, after which the method flow continues back to block 606.

If, at block 614, the pre-analysis module 110 determines that the base metric for the block 105 has been calculated for all desired dynamic ranges at all desired spatial scales, the method flow continues to block 618. At block 618, the multi-scale metric calculator 135 generates a multi-scale metric 150 for the block 105. In some embodiments, the multi-scale metric 150 includes normalized values of the base metrics measured at each spatial scale and at each dynamic range setting. In some embodiments, the normalized values of the multi-scale metric 150 are represented by a floating-point number or a fixed-point number.

Figure 7:
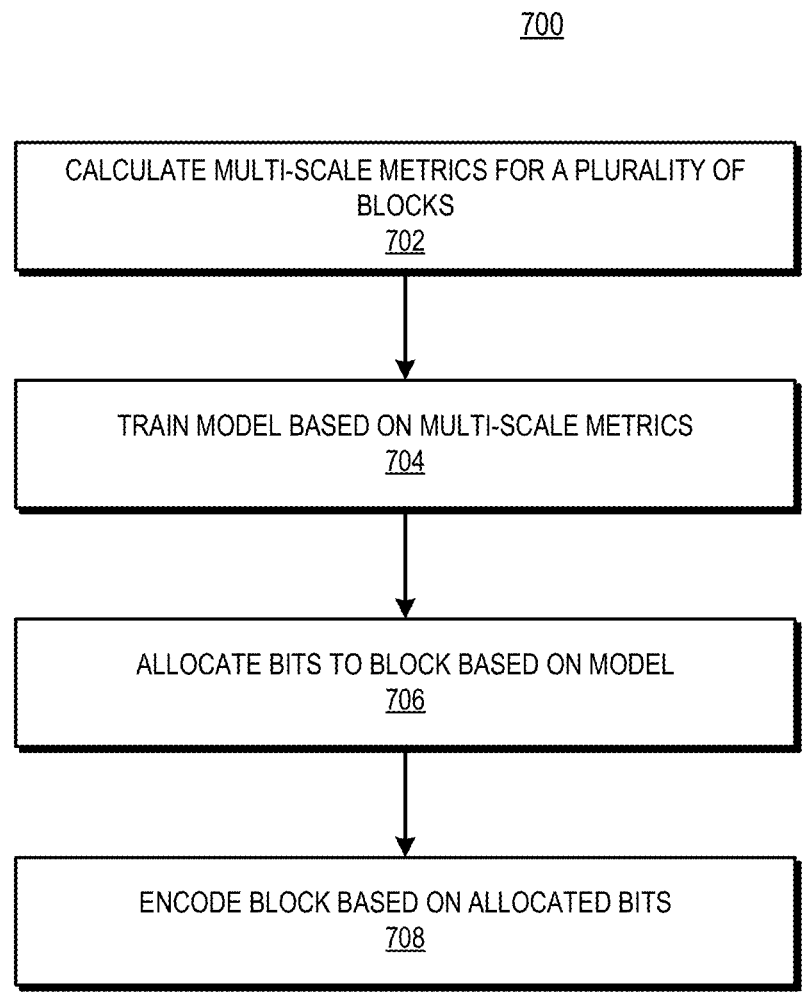
FIG. 7 is a flow diagram illustrating a method for applying a multi-scale metric to encode a block in accordance with some embodiments.

FIG. 7 is a flow diagram illustrating a method 700 for applying a multi-scale metric to encode a block in accordance with some embodiments. The method 700 is implemented in some embodiments of the processing system 100 shown in FIG. 1. At block 702, the multi-scale metric calculator 135 generates multi-scale metrics for a plurality of blocks from a large set of videos. At block 704, the pre-analysis module 110 trains a model using regressive model or machines learning methods such as random forest regression based on the multi-scale metrics for the blocks and inputs such as the number of bits used to compress a block at a particular quantization parameter (QP), the QP that most closely achieves a target bit budget, and perceptual importance derived from a metric such as Video Multimethod Assessment Fusion (VMAF), peak signal to noise ratio (PSNR), Structural Similarity Index (SSIM), Detail Loss Metric (DLM), or Visual Information Fidelity (VIF). At block 706, the pre-analysis module 110 allocates bits to each block based on the model. At block 708, the encoder 160 encodes the block using the selected QP.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   estimating, at a pre-analysis module, for a first block of a first image, levels of pixel activity at a plurality of spatial compression scales;
   determining, at the pre-analysis module, a multi-scale metric for the first block based on the levels of pixel activity at each of the plurality of spatial compression scales, the multi-scale metric indicating how bit allocation or assignment of a quantization parameter is predicted to affect perceptual quality of the block;
   encoding, at an encoder, the first block based on the multi-scale metric of the first block; and
   transmitting the encoded first block over a network for display to a user.

2. The method of claim 1, further comprising:
   estimating, for the first block of the first image, levels of pixel activity at a plurality of dynamic range scales;

estimating an amount of flesh tone or other memory colors in the first block of the first image; and wherein determining the multi-scale metric is further based on the levels of pixel activity at each of the plurality of dynamic range scales and the amount of flesh tone or other memory colors.

3. The method of claim 1, wherein encoding comprises: determining a first number of bits to be used to compress the first block at a first quantization parameter based on the multi-scale metric of the first block.

4. The method of claim 1, wherein encoding comprises: determining a first quantization parameter for encoding the first block into a first number of bits based on the multi-scale metric of the first block.

5. The method of claim 1, wherein encoding comprises: determining a measure of perceptual quality of the first block based on the multi-scale metric of the first block.

6. The method of claim 1, wherein estimating levels of pixel activity is based on one of a spatial gradient or a wavelet transform.

7. The method of claim 1, further comprising:
estimating, for a second block of the first image, levels of pixel activity at a plurality of spatial compression scales; and
determining a multi-scale metric of the second block based on the levels of pixel activity.

8. The method of claim 7, further comprising:
comparing the multi-scale metric of the first block to the multi-scale metric of the second block; and
encoding the second block based on the comparison.

9. A method, comprising:
calculating, at a pre-analysis module, a multi-scale metric for each of a plurality of blocks of a first image based on estimates of pixel activity in each of the plurality of blocks at each of a plurality of dynamic range scales, the multi-scale metric indicating how bit allocation or assignment of a quantization parameter is predicted to affect perceptual quality of a block;
encoding, at an encoder, each of the plurality of blocks based on the multi-scale metric corresponding to the block; and
transmitting each of the plurality of encoded blocks over a network for display to a user.

10. The method of claim 9, wherein calculating the multi-scale metric is further based on estimates of pixel activity at each of a plurality of spatial compression scales and estimates of an amount of flesh tone or other memory colors present in each of the plurality of blocks.

11. The method of claim 9, wherein encoding comprises: determining a first number of bits to be used to compress a first block of the plurality of blocks at a first quantization parameter based on the multi-scale metric of the first block.

12. The method of claim 9, wherein encoding comprises: determining a first quantization parameter for encoding a first block of the plurality of blocks into a first number of bits based on the multi-scale metric of the first block.

13. The method of claim 9, wherein encoding comprises: determining a measure of perceptual quality of a first block of the plurality of blocks based on the multi-scale metric of the first block.

14. The method of claim 9, further comprising:
estimating levels of pixel activity for each block based on one of a spatial gradient or a wavelet transform.

15. The method of claim 9, further comprising:
comparing the multi-scale metric of a first block of the plurality of blocks to the multi-scale metric of a second block of the plurality of blocks; and
encoding the second block based on the comparison.

16. A device, comprising:
a pre-analysis module configured to:
estimate, for a first block of a first image, levels of pixel activity at a plurality of spatial compression scales;
determine a multi-scale metric for the first block based on the levels of pixel activity, the multi-scale metric indicating how bit allocation or assignment of a quantization parameter is predicted to affect perceptual quality of the first block; and
provide the multi-scale metric to an encoder for encoding the first block based on the multi-scale metric of the first block.

17. The device of claim 16, wherein the pre-analysis module is further configured to estimate, for the first block of the first image, levels of pixel activity at a plurality of dynamic range scales and amount of flesh tone or other memory colors; and wherein the multi-scale metric for the first block is further based on the amount of flesh tone or other memory colors.

18. The device of claim 16, wherein the pre-analysis module is further configured to determine a first number of bits to be used to compress the first block at a first quantization parameter based on the multi-scale metric of the first block.

19. The device of claim 16, wherein the pre-analysis module is further configured to determine a first quantization parameter for encoding the first block into a first number of bits based on the multi-scale metric of the first block.

20. The device of claim 16, wherein the pre-analysis module is further configured to determine a measure of perceptual quality of the first block based on the multi-scale metric of the first block.

* * * * *